United States Patent
Wu

(10) Patent No.: US 6,264,168 B1
(45) Date of Patent: Jul. 24, 2001

(54) PRACTICAL FORGED FLANGE-TYPE VALVE FABRICATION METHOD

(76) Inventor: Lei-Jui Wu, No,13,Fang Yuan Hsiang,Hou Liao Tsun, Kung Chu 4 Road, Chang Hua Hsien (TW)

( * ) Notice: Subject to any disclaimer, the term of this patent is extended or adjusted under 35 U.S.C. 154(b) by 0 days.

(21) Appl. No.: 09/260,558

(22) Filed: Mar. 2, 1999

Related U.S. Application Data

(63) Continuation-in-part of application No. 09/074,378, filed on May 8, 1998, now Pat. No. 5,901,946.

(51) Int. Cl.$^7$ ...................................................... F16K 5/06
(52) U.S. Cl. .................................. 251/315.14; 89/890.13
(58) Field of Search ....................... 251/315.13, 315.14; 29/890.13

(56) References Cited

U.S. PATENT DOCUMENTS

| | | | | |
|---|---|---|---|---|
| 1,828,478 | * | 10/1931 | Sparks | 29/890.13 |
| 2,098,318 | * | 11/1937 | Taylor | 29/890.13 |
| 3,226,080 | * | 12/1965 | Lowrey | 251/315.13 |
| 3,981,482 | * | 9/1976 | Callahan, Jr. et al. | 251/152 |
| 4,356,612 | * | 11/1982 | Becker et al. | 29/890.128 |
| 4,934,656 | * | 6/1990 | Groves et al | 251/315.13 |
| 5,752,690 | * | 5/1998 | Ellett | 251/152 |

\* cited by examiner

*Primary Examiner*—John Fox
(74) *Attorney, Agent, or Firm*—Dougherty & Troxell

(57) ABSTRACT

A forged flange-type valve fabrication method that has all the left and right pipeline connections thread fastened to the two sides of the valve body. Utilizing such a forging method, one-piece or two-piece valves have a left and a right primary elements and structurally identical left and the right pipeline connection sections of a two-piece flange-type valve, the ball valve housing section of a one-piece flange-type valve, the plug, the ball valve housing section, and the ball valve position limiter section. External threads and water-tight gasket sleeves are formed on front outer side and ends of the left pipeline connection section of a one-piece flange-type valve and the left and the right pipeline connection sections of a two-piece flange-type valve. Internal threads are tapped in the left connection hole in the structurally identical ball valve housing sections of a one-piece or a two-piece flange-type valve and the right connection hole of the ball valve limiter section. The left pipeline connection section of the one-piece flange-type valve is structurally identical to the left and the right pipeline connections sections of the two-piece flange-type valve and as such either of the pipeline connection sections can be fastened tightly to the left connection hole of the ball valve housing section and the right connection hole of the ball valve position limiter section, which enables the left and the right pipeline connection sections of the one-piece or the two-piece flange-type valve to be interchangeable.

5 Claims, 10 Drawing Sheets

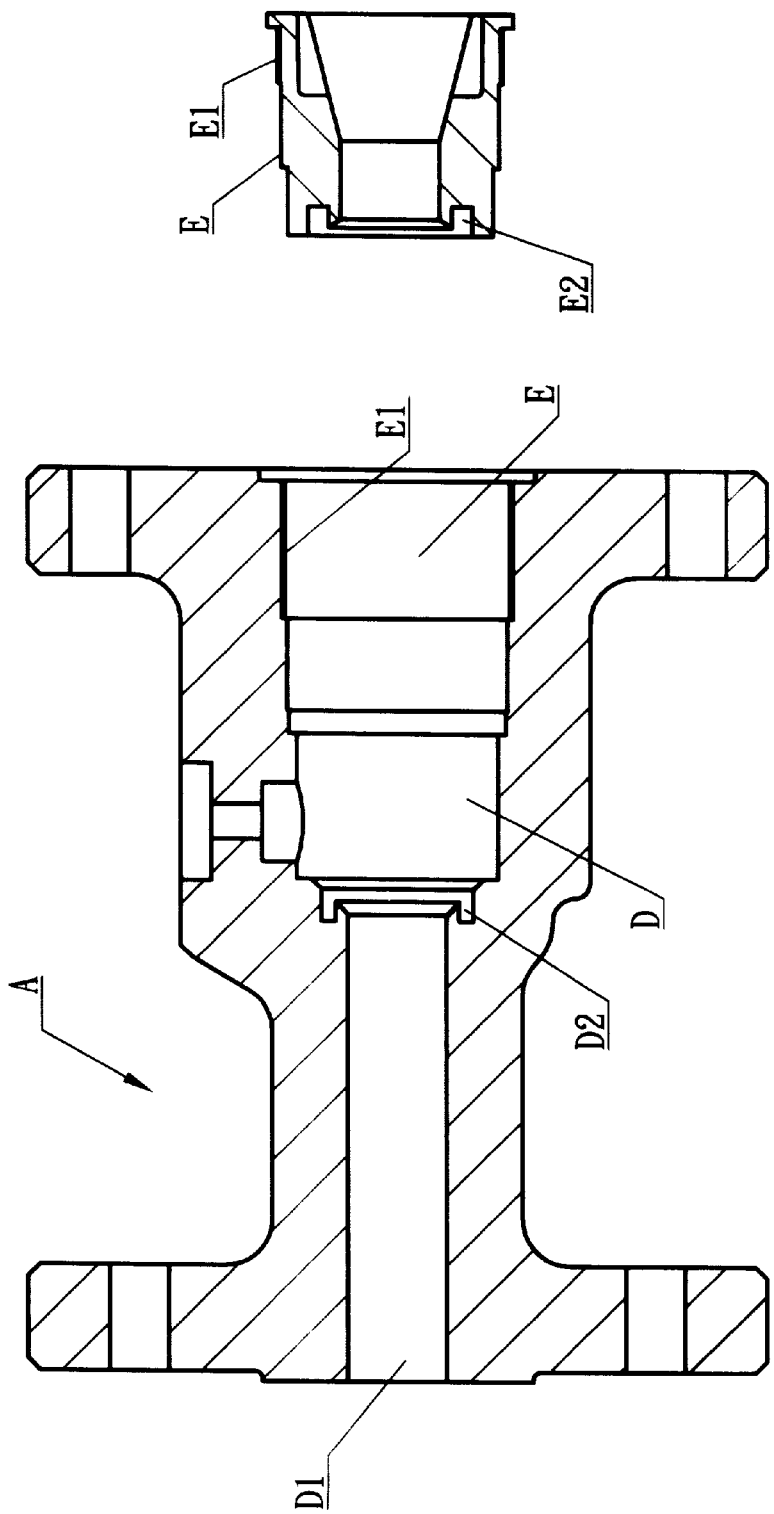
FIG. 1-A
PRIOR ART

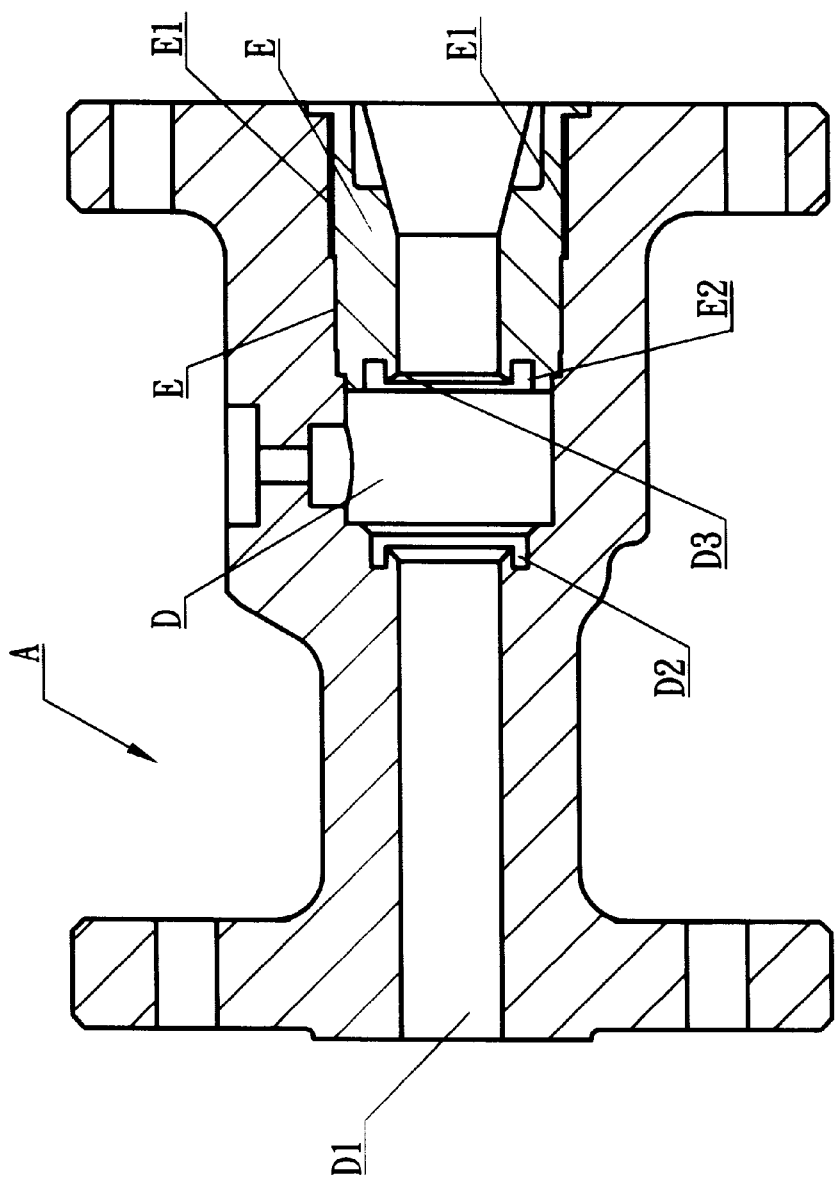
FIG. 1-B

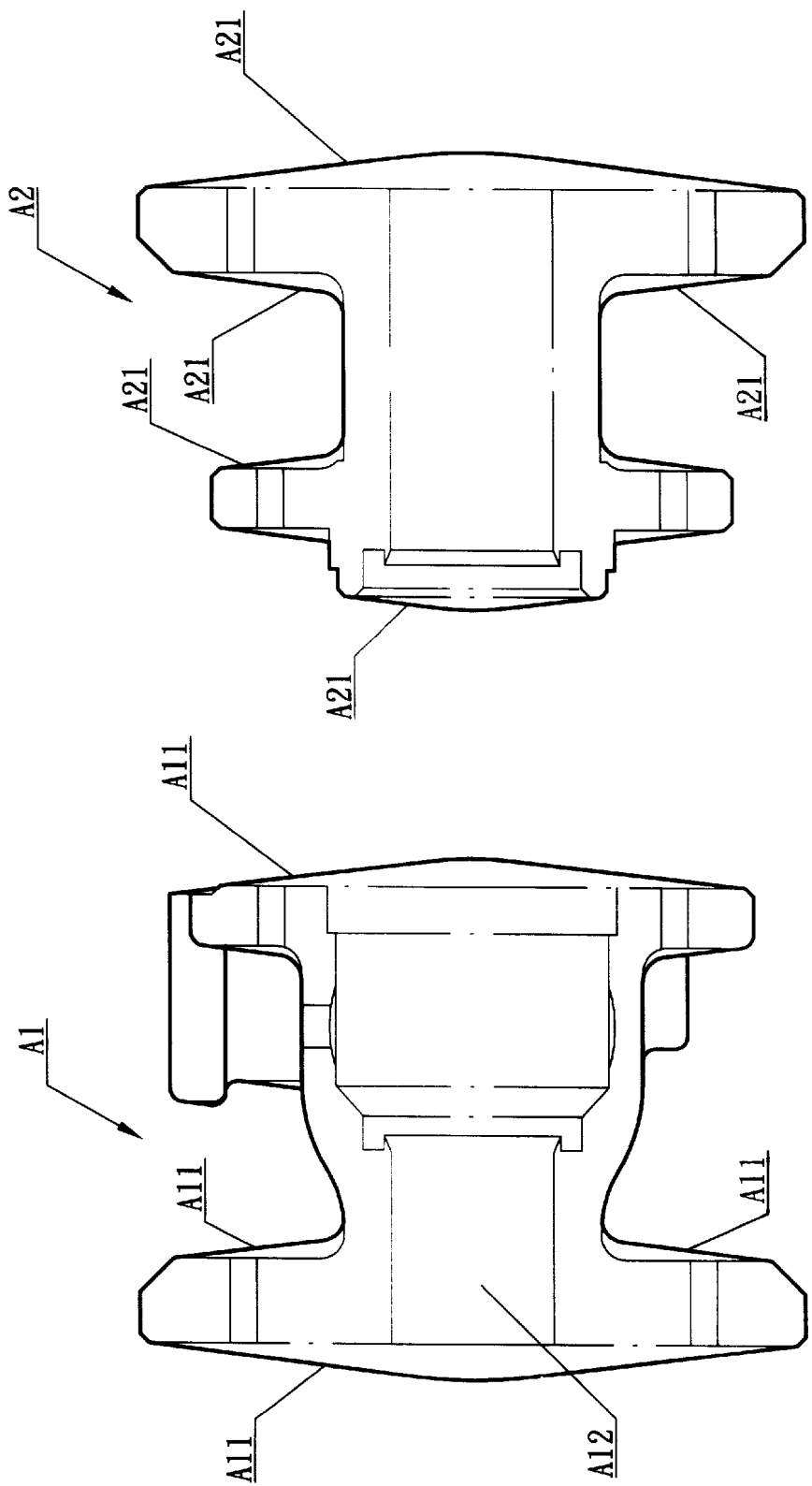
FIG. 2-B PRIOR ART
FIG. 2-A PRIOR ART

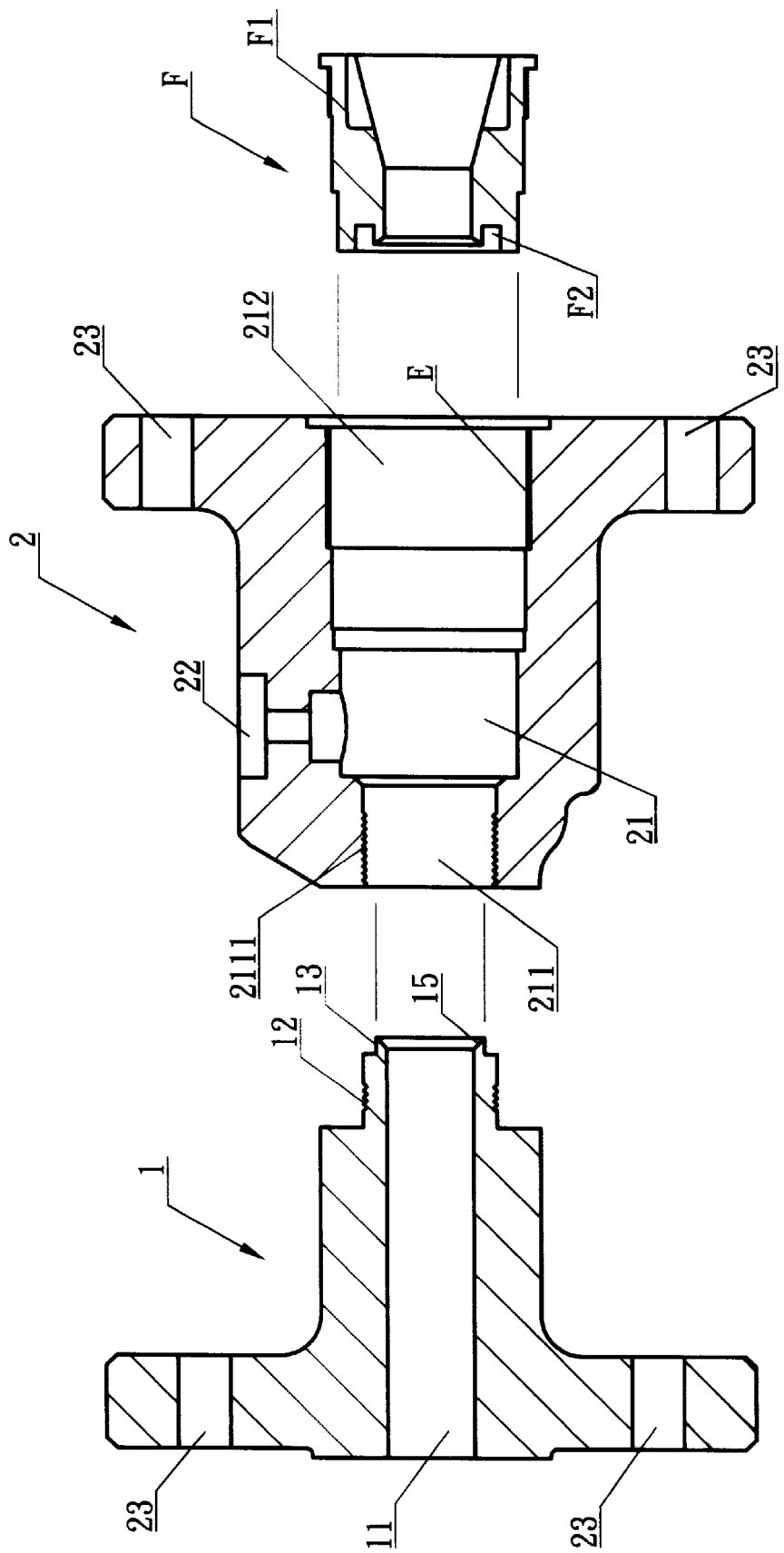
FIG. 3-A

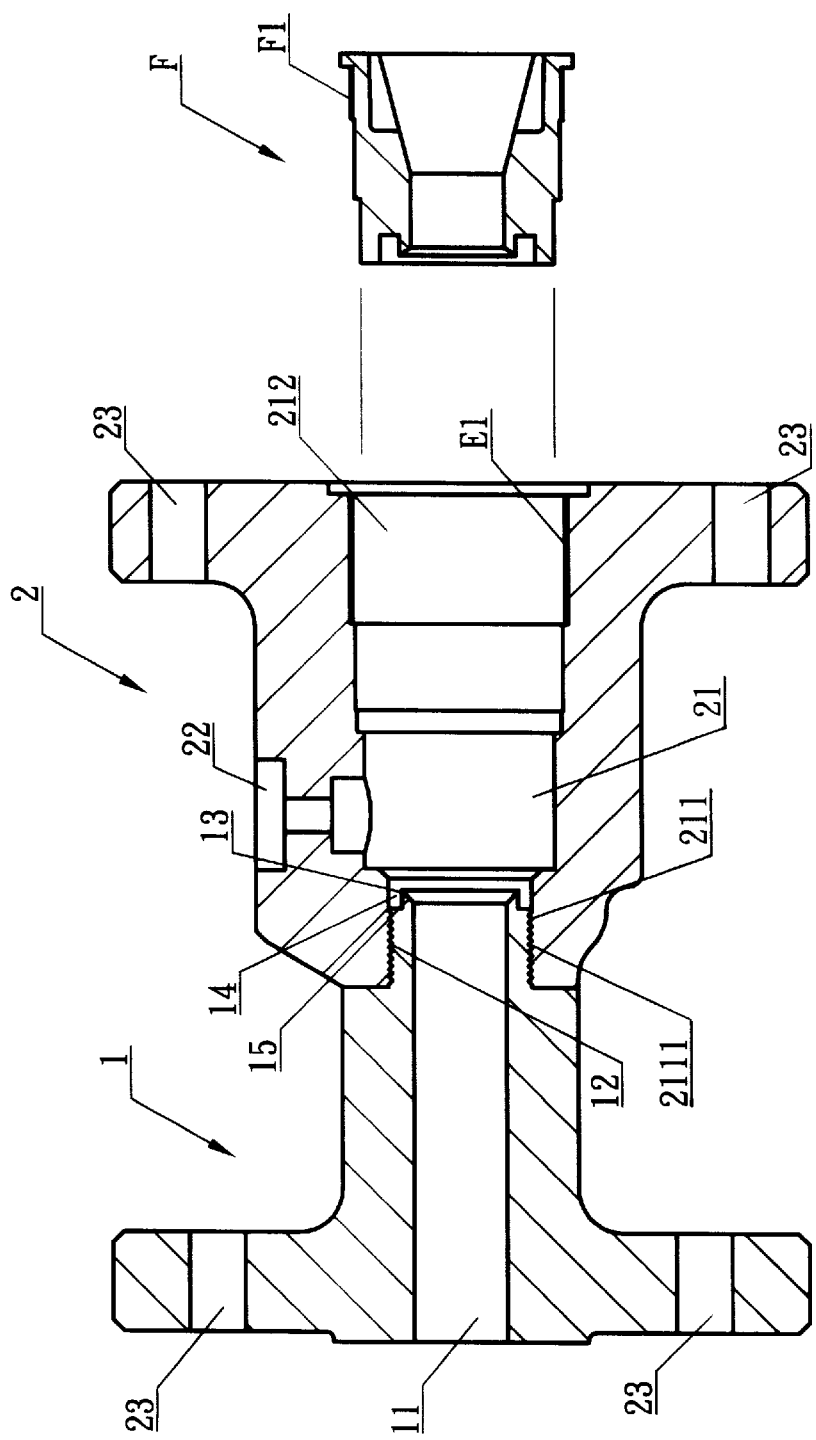
FIG. 3-B

PRACTICAL FORGED FLANGE-TYPE VALVE FABRICATION METHOD

CROSS-REFERENCE TO RELATED APPLICATION

The present application is a continuation-in-part of application Ser. No. 09/074,378, filed on May 8, 1998, now U.S. Pat. No. 5,901,946.

BACKGROUND OF THE INVENTION

1. Field of the Invention

The invention herein relates to a practical forged flange-type valve fabrication method that utilizes the blueprinted profiles of cast valves to forge one-piece or two-piece flange-type valves. In the practical forged fabrication method, the left and the right primary elements of one-piece or two-piece flange-type valves are delineated by the divisions of the neck sections and includes the forging the blanks of the left pipeline connection section of a one-piece flange-type valve and the structurally identical left and the right pipeline connection sections of a two-piece flange-type valve, the ball valve housing section of a one-piece flange-type valve, the plug, the ball valve housing section, and the ball valve position limiter section. External threads and water-tight gasket sleeves are respectively machined onto front outer sides and ends of the left pipeline connection section of a one-piece flange-type valve and the left and the right pipeline connection sections of a two-piece flange-type valve and internal threads are tapped in the left connection hole of the structurally identical ball valve housing sections of a one-piece or a two-piece flange-type valve as well as the right connection hole of the ball valve limiter section. The left pipeline connection section of the one-piece flange-type valve is structurally identical to the left and the right pipeline connection sections of the two-piece flange-type valve, such that the left connection hole of the ball valve housing section and the right connection hole of the ball valve position limiter section can be coated with a thread locking agent and tightly fastened together, which enables the left and the right pipeline connection sections of the one-piece or the two-piece flange-type valve to be interchangeable. In addition to maintaining the original strength and appearance of forging, the invention herein lowers production costs, reduces storage needs, lessens material waste, shortens the finishing time, and decreases defect rates, 2. Description of the Prior Art Conventional flange-type valves include one-piece and two-piece flange-type valves that are generally all cast fabricated because the left and right primary elements can be cast as a single structural entity and, furthermore, most of the interior and exterior features of the said initial blanks are already formed after being cast into shape and only require the finishing and drilling of various sections to complete the valve. However, cavitation readily occurs during the casting process and to lessen the fine surface pitting resulting from the said cavitation, the initial blanks are given additional thickness to provide for interior and exterior finishing. While this reduces fine pitting, the removed constitutes an enormous waste and, furthermore, the complete elimination of the pitting is not possible. As a result, defect rates tend to increase and defective products that are marketed may leak. Soldering or welding during maintenance could unavoidably result in explosions or fires, which are common disasters often observed.

Due to the said shortcomings of ball valves that are fabricated by casting, the industry expected to avoid pitting flaws by forging the valve bodies. Referring to FIG. 1, the initial blank of a forged two-piece flange-type valve of typical manufacture achieved the objective of single-entity forming but still utilizes horizontal forging technology to forge the one-piece flange-type valve. The one-piece flange-type valve A requires the vertically oriented die removal angle B during fabrication to facilitate opening the die and, furthermore, the fabricated blank was solid and still requires hollowing out and drilling. Referring to FIG. 1-A and FIG. 1-B, the left water-tight gasket containment recess D2 and the right inverted angle D3 were formed in close proximity between the ball valve chamber D and the left passage D1, and then the left and the right water-tight gaskets were inserted into the left and the right water-tight gasket containment recesses D2 and F2. To enable the installation of the ball valve into the ball valve chamber D, the passage E had the same diameter as the ball valve and also required fastening the right external threads F1 of the plug F to the right internal threads E1 of the right passage E. Therefore, the right water-tight gasket containment recess F2 was formed on the end surface of the plug F and then the right water-tight gasket was inserted into the said right water-tight gasket containment recess F2 and rested against the ball valve. This is essentially how one-piece flange-type valves are still fabricated and the method has not undergone any alterations since inception. Compared to current forging approaches, the solid one-piece flange-type valve A requires complex and arduous machining and, furthermore, wastes substantial amounts of material that is reflected in greater production costs and the expensive price detracts from market competitiveness. Users are denied returns and have no alternative but to continue utilizing such cast valves that easily develop problems which often unavoidably lead to hazardous situations.

Referring to FIG. 2, the two-piece flange-type valve is forged as the left and right primary elements A1 and A2, but because of the limitations on easily opening the dies after forming, a die removal angle had to be included inside the die which left a vertically oriented border on the left and right primary elements A1 and A2 that was manifested in the die release angles A11 and A21. Furthermore, the required center passages as well as the ball valve chamber of the left and right primary elements A1 and A2 could not be formed at the same time. The left and right primary elements A1 and A2 were solid blanks that still required shaping to become a ball valve. For example, the area indicated by the invisible line in the left and right primary elements A1 and A2 had to be removed and, therefore, additional material had to be utilized in the shaping. Forging was followed by several stages of difficult finishing, which involved the waste of material. As such, although forging was expected to solve the shortcomings of casting such as high material and finishing costs, the problems encountered were the same as those of conventional one-piece flange-type valves and the cost remained high, the product did not impress users and could not be successfully promoted to consumers because improvement was still necessary.

Therefore, in view of the said shortcomings, the inventor of the invention herein addressed the said drawbacks by conducting research based on many years of production experience, with efforts finally culminated in the research and development of the invention herein.

SUMMARY OF THE INVENTION

The primary objective of the invention herein to provide a practical forged flange-type valve fabrication method that utilizes the blueprinted profiles of cast valves to forge one-piece or two-piece flange-type valves. In the practical forged fabrication method, the left and the right primary elements of one-piece or two-piece flange-type valves are delineated by the divisions of the neck sections and includes forging the blanks of the left pipeline connection section of a one-piece flange-type valve and the structurally identical left and the right pipeline connection sections of a two-piece flange-type valve, the ball valve housing section of a one-piece flange-type valve, the plug, the ball valve housing section, and the ball valve position limiter section. External threads and the water-tight gasket sleeves are respectively machined onto front outer sides and ends of the left pipeline connection section of the one-piece flange-type valve and the left and the right pipeline connection sections of the two-piece flange-type valve. Internal threads are tapped in the left connection hole of the structurally identical ball valve housing sections of a one-piece or a two-piece flange-type valve and the right connection hole of the ball valve limiter section. The left pipeline connection section of the one-piece flange-type valve is structurally identical to the left and the right pipeline connection sections of the two-piece flange-type valve and as such either of the said pipeline connection sections can be coated with a thread locking agent and fastened tightly to the left connection hole of the ball valve housing section and the right connection hole of the ball valve position limiter section, which enables the left and the right pipeline connection sections of the one-piece or the two-piece flange-type valve to be interchangeable. In addition to maintaining the original strength and appearance of forging, the invention herein lowers production costs, reduces storage needs, lessens material waste, shortens the finishing time, and decreases defect rates.

Another objective of the invention herein is to provide a practical forged flange-type valve fabrication method, in which the left and the right water-tight gasket sleeves at the front end of the left pipeline connection section and the right pipeline connection section of a one-piece and the two-piece flange-type valve are inserted into the left connection hole in the ball valve housing section of the one-piece flange-type valve or the left and the right connection holes in the ball valve housing section and the ball valve position limiter section of a two-piece flange-type valve to naturally form the left and the right water-tight gasket containment recess in between the left and the right gasket sleeve and the walls of the left and the right connection holes to thereby achieve an easier finishing process and avoid the complex finishing tasks encountered in casting or conventional forging fabrication.

Yet another objective of the invention herein is to provide a practical forged flange-type valve fabrication method, in which the left pipeline connection section of the said one-piece flange-type valve and the left and the right pipeline sections of the two-piece flange-type valve are structurally identical and, therefore, can be interchangeably fastened to the said left connection hole of the said ball valve housing section as well as the right connection hole of the said ball valve position limiter section to thereby reduce storage requirements and decrease production costs.

The fabrication method of the invention herein is further elaborated in the brief description of the drawings below which is followed by the detailed description of the invention herein.

BRIEF DESCRIPTION OF THE DRAWINGS

FIG. 1-A is an exploded cross-sectional view of the completed forged blank of a conventional one-piece flange-type valve and the component to be fitted.

FIG. 1-B is a cross-sectional view of the assembled conventional one-piece flange-type valve.

FIGS. 2A and 2B are side views of the forged blanks of a conventional two-piece flange-type valve, with the sections that still require finishing indicated.

FIG. 3-A is an exploded cross-sectional drawing of the finished forged components of the one-piece flange-type valve of the invention herein.

FIG. 3-B is an exploded cross-sectional drawing of the partially forged one-piece flange-type valve of the invention herein.

DETAILED DESCRIPTION OF THE INVENTION

Figure 1:
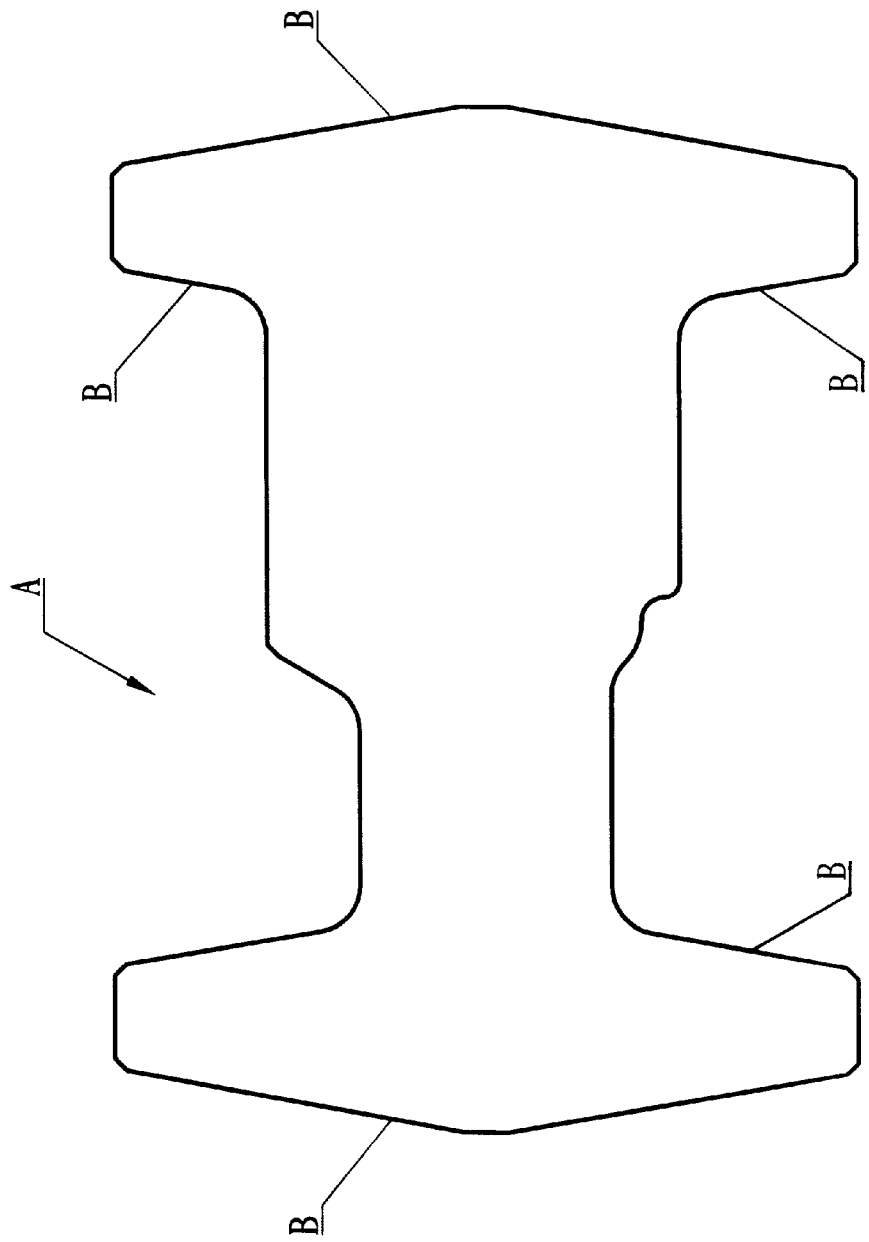
FIG. 1 is side view of the forged blank of a conventional one-piece flange-type valve, with the sections that still require finishing indicated.
Figure 3:
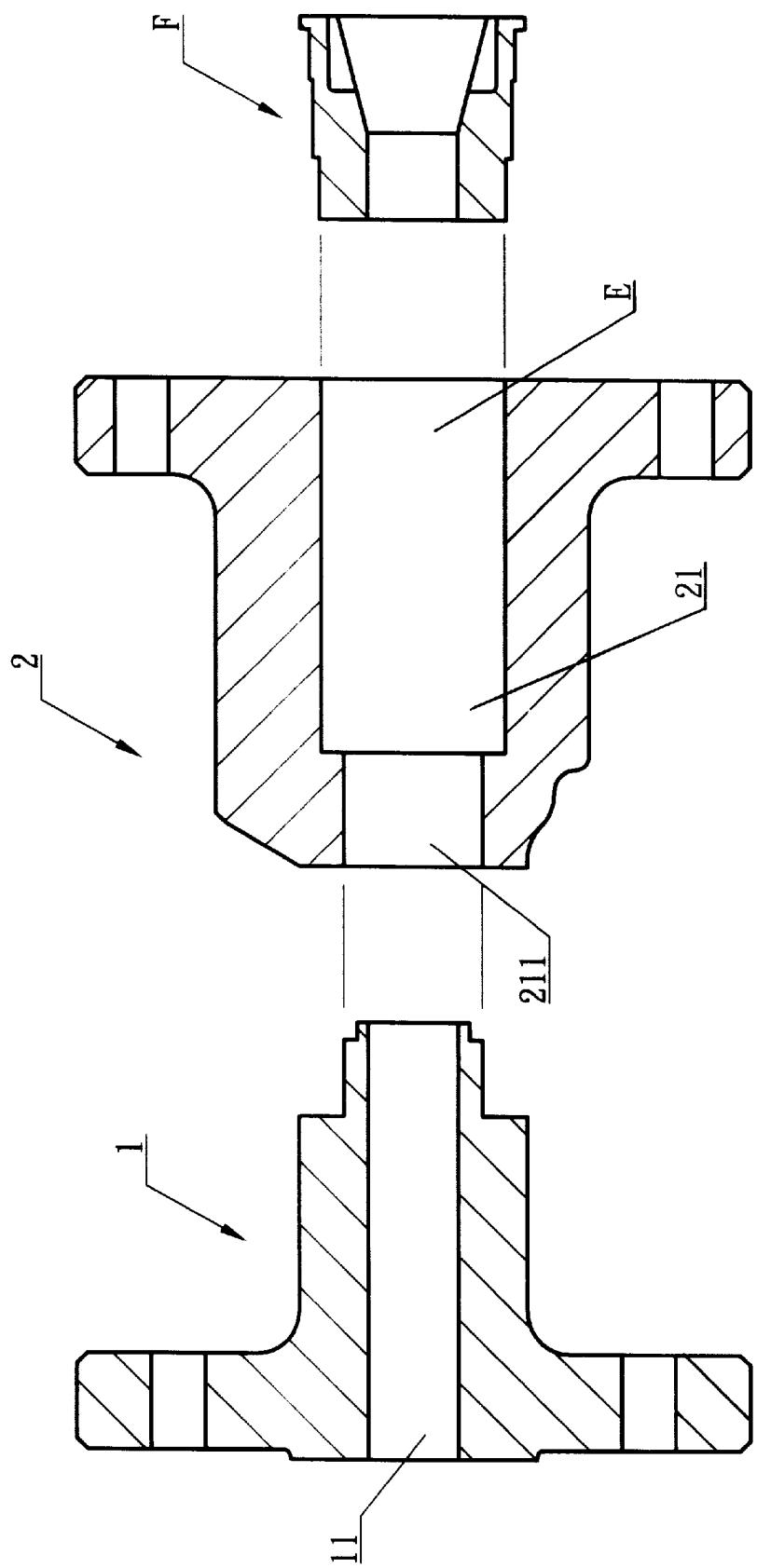
FIG. 3 is an exploded cross-sectional drawing of the forged component blanks of the one-piece flange-type valve of the present invention.

Referring to FIG. 3, a blueprint of a cast one-piece flange-type valve profile that was utilized for the forging method of the invention herein. The neck sections of the one-piece flange-type valve were referenced to delineate the respective divisions to forge the blanks of the left pipeline connection section 1, the ball valve housing section 2, and the plug F (this section is identical to the conventional component shown in FIG. 1) and, at the same time, the forming of a left passage 11 inside both the left pipeline connection section 1 and the ball valve housing section 2 as well as the forming of the ball valve chamber 21, the left connection hole 211 that bridges the two sides and the right passage E (identical to that of the counterpart. Referring to FIG. 3-A, the left internal threads 2111 and the left external threads 12 are formed inside the left connection hole 211 and outside the front end of the left pipeline connection section 1, respectively, and then the water-tight gasket sleeve 13 is formed on the surface at the front end of the left passage 11 in the left pipeline connection section 1, followed by the drilling of the handle mounting hole 22 and the threaded holes 23. Referring to FIG. 3-B, when the ball valve has been placed into the ball valve chamber 21 through the right passage E, the external threads 12 of the left pipeline connection section 1 and the right external threads F1 of the plug F are coated with a thread locking agent and then screwed tightly into the left internal threads 2111 in the left connection hole 211 of the ball valve housing section 2 and the right internal threads E1 of the right passage E, which forms a left water-tight gasket containment recess 14 in between the water-tight gasket sleeve 13 of the left pipeline connection section 1 and the wall of the left connection hole 211 in the for the respective insertion of the left and right water-tight gaskets into the left water-tight gasket containment recess 14 and the right water-tight gasket recess F2 that rest against the spherical surface of the ball valve 24.

Figure 4:
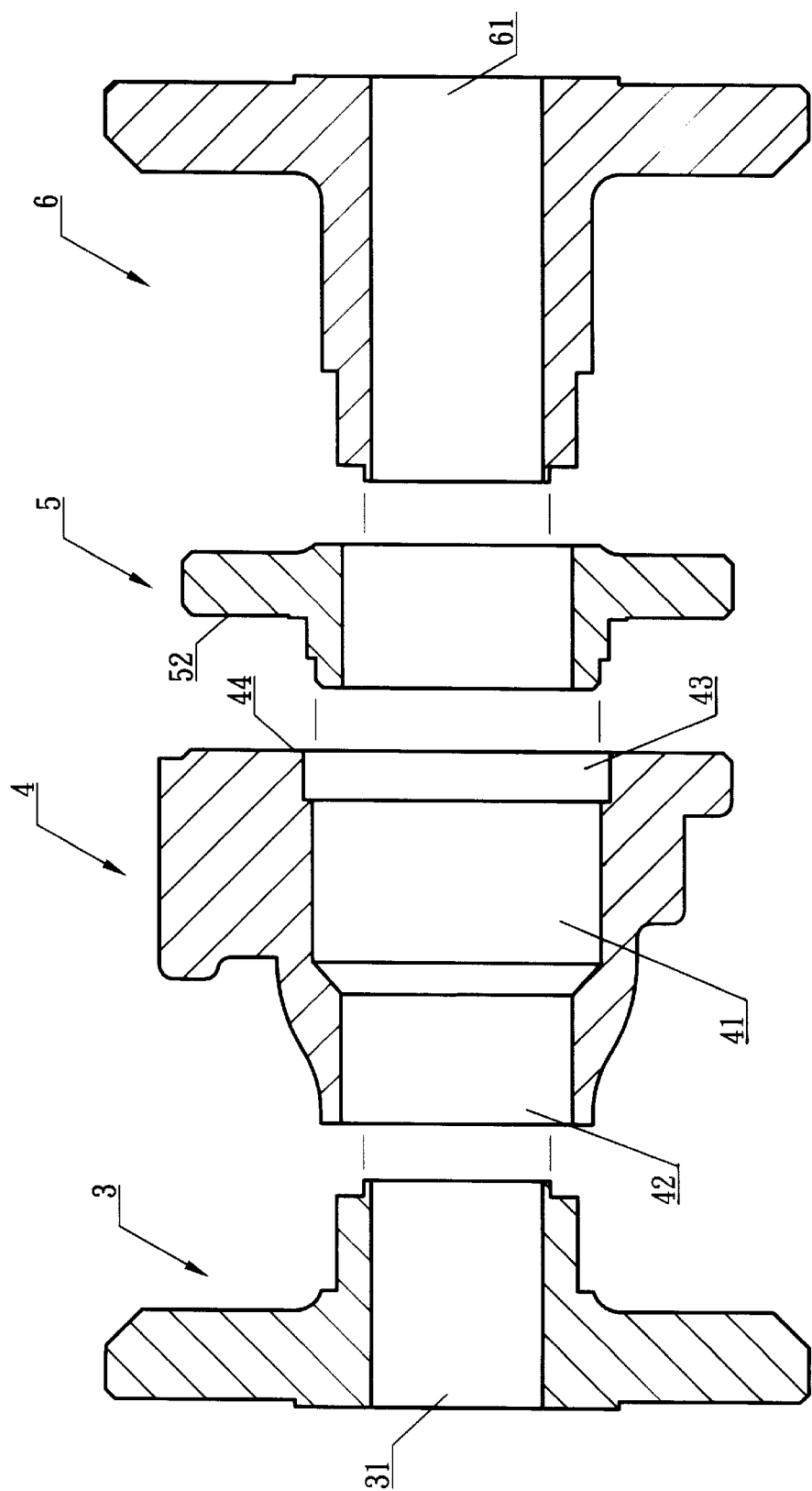
FIG. 4 is an exploded cross-sectional drawing of the forged blanks of the two-piece flange-type valve of the invention herein.

Referring to FIG. 4, a blueprint of a cast two-piece flange-type valve profile that was utilized for the forging method of the invention herein. The neck sections of the left and right primary elements constituting the two-piece flange-type valve were referenced to delineate the respective divisions to forge the blanks of the left pipeline connection section 3, the ball valve housing section 4, the ball valve position limiter section 5, and the right pipeline connection section 6. At the same time, the left and right passages 31 and 61 were formed inside the left and right pipeline connection sections 3 and 6, respectively, along with the forging of the ball valve chamber 41 for the placement of the ball valve, the forming of the left connection hole 42 and the stepped position hole 43 at the front and rear extent, respectively, of the ball valve chamber 41, and the mating surface 44 at the opposite side of the left connection hole 42. Furthermore, the right connection hole 51 and the mating surface 52 are formed inside the ball valve position limiter section 5 at the same time.

Figure 5:
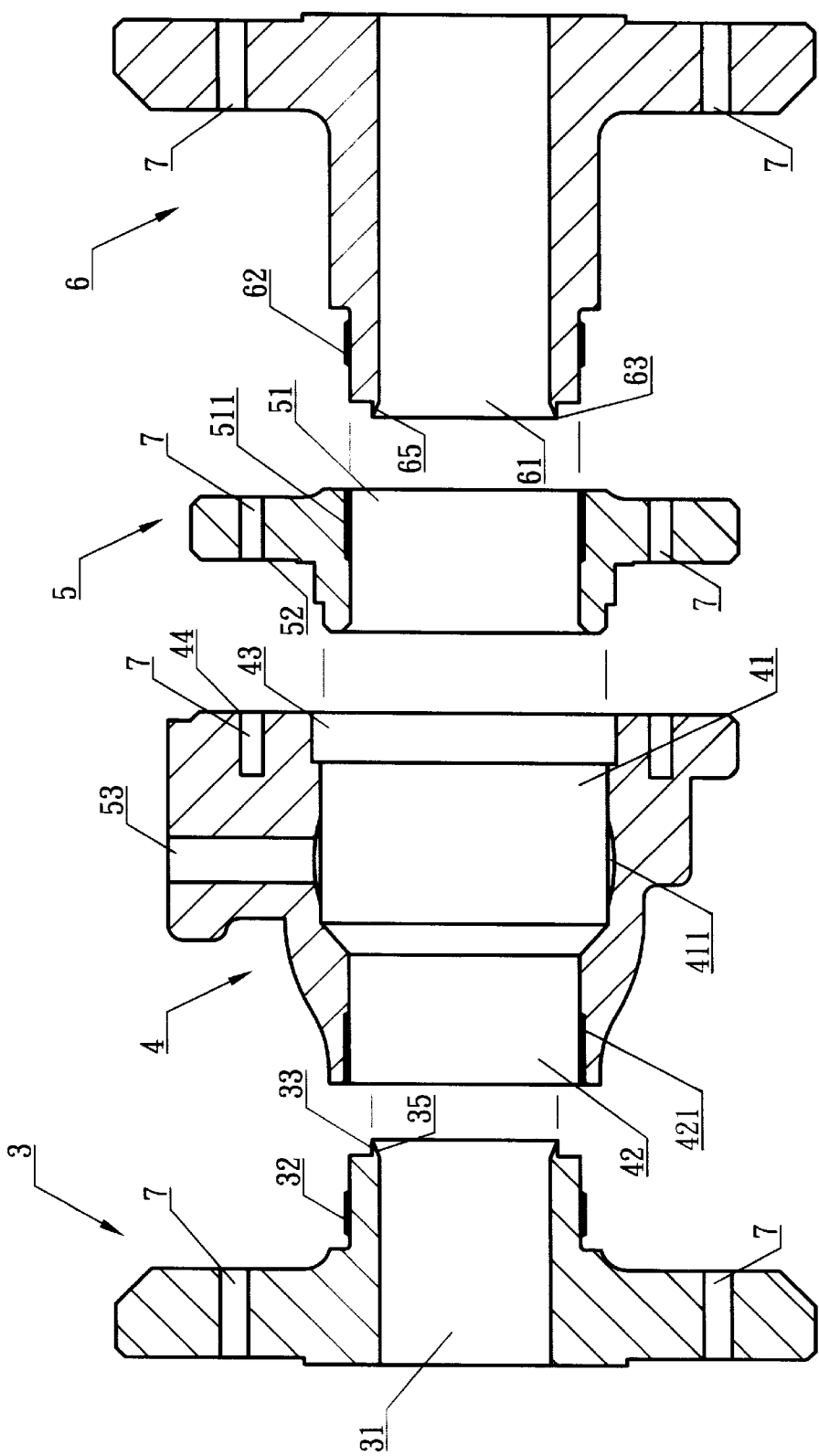
FIG. 5 is an exploded cross-sectional drawing of the finished forged blanks of the two-piece flange-type valve of the invention herein.

Referring to FIG. 5, the finishing only involves the drilling and tapping of the handle mounting hole 53 and the threaded holes 7 as well as the machining of the spherical surface 411 of the ball valve chamber 41. The left and right water-tight water gasket sleeves 33 and 63 as well as the left and right inverted angles 35 and 65 that position the ball valve are respectively lathed at the front ends of the left and right pipeline connection sections 3 and 6. Along the surfaces of the left and right passages 31 and 61, the left and right external threads 32 and 62 are respectively formed along the front ends of the left and right pipeline connections 3 and 6, and the left and right internal threads 421 and 511 are respectively tapped in the left and right connection holes 42 and 51 of the ball valve housing section 4 and the ball valve position limiter section 5. The left external threads 32 of the left pipeline connection section 3 are then coated with a thread locking agent and screwed tightly into the left internal threads 421 in the left connection hole 42 of the ball valve housing section 4, which naturally forms the left water-tight gasket containment recess 34 in between the left water-tight gasket sleeve 33 of the left pipeline connection section 3 and the wall of the left connection hole 42 in the ball valve housing section 4, thereby completing the fabrication of the left primary element A1. Next, the right external threads 62 of the right pipeline connection section 6 is coated with a thread locking agent and screwed tightly to the right internal threads 511 in the right connection hole 51 of the ball valve position limiter section 5, which forms the right water-tight gasket containment recess 64 in between the right water-tight gasket sleeve 63 of the right pipeline connection section 6 and the wall of the right connection hole 51 in the ball valve position limiter section 5, thereby completing the fabrication of the right primary element A2.

Figure 6:
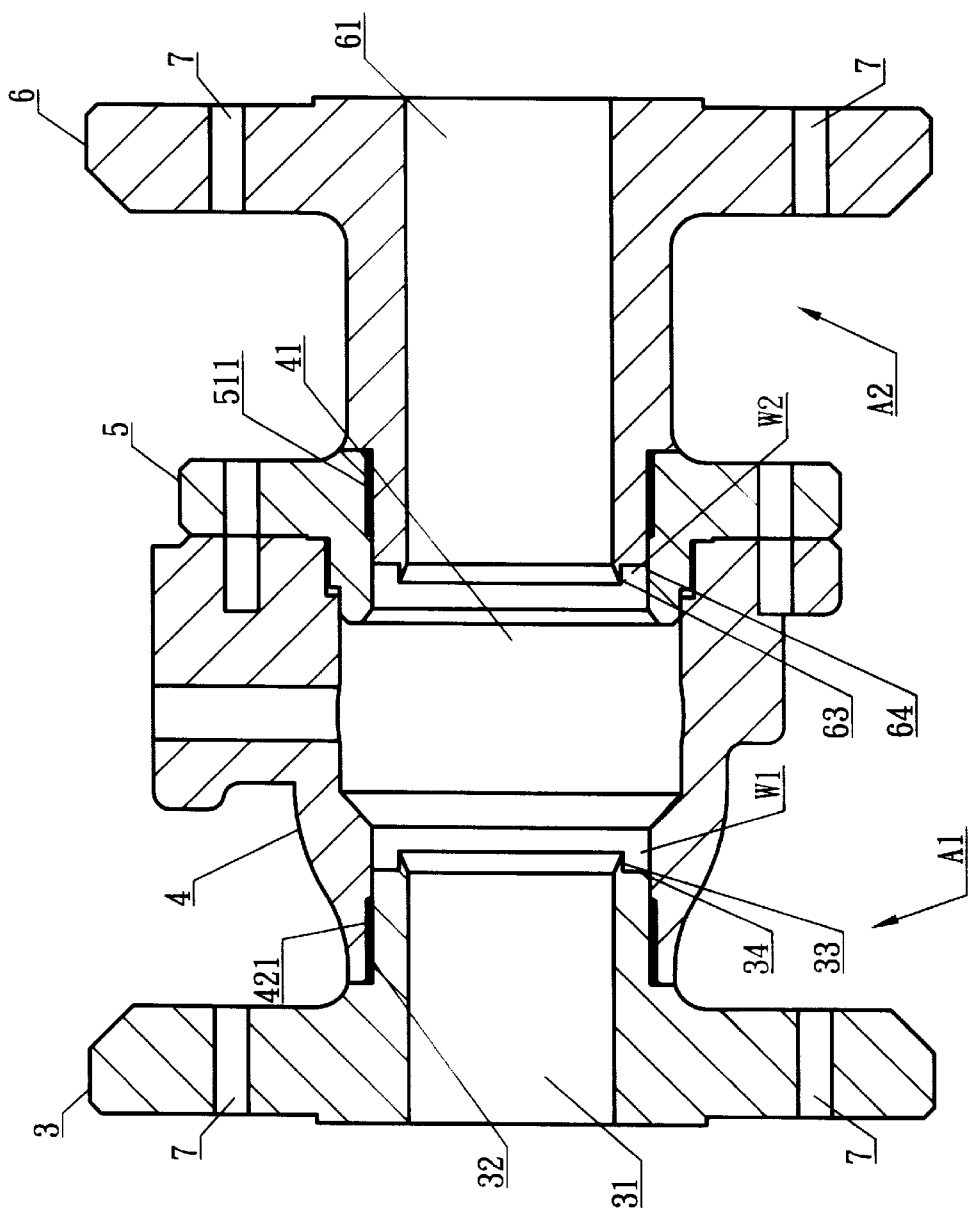
FIG. 6 is a cross-sectional drawing of the finished and assembled invention of FIGS. 4 and 6.

Referring to FIG. 6, after the two water-tight gaskets W1 and W2 have been inserted into the left and the right water-tight gasket containment recesses 34 and 64, respectively, the ball valve is placed inside the ball valve chamber 41, with the said left and right water-tight gaskets W1 and W2 resting against the top of the ball valve, the control handle is installed into the handle mounting hole 52 and screws are positioned in the insertion holes 7 through the left and the right mating surfaces 52 and 44 of the ball valve position limiter section 5 and the ball valve housing section 4 and fastened securely to thereby complete the fabrication of an apparently forged and unitary structured two-piece flange-type valve.

Referring to FIG. 3-A and FIG. 5, the left pipeline connection section 1 of the one-piece flange-type valve and the left pipeline connection section 3 and the right pipeline connection section 6 of the two-piece flange-type valve all have the left and right external threads 12, 32, and 62 as well as the left and right water-tight gasket sleeves 13, 33, and 63 formed at the front ends and are coated with a thread locking agent and then screwed tightly into the left and the right internal threads 2111 and 421 of the left connection hole 211 and 42 in the one-piece flange-type valve ball valve housing section 2 as well as the internal threads 511 of the right connection hole 51 in the two-piece flange-type valve ball valve position limiter section 5, which enables the left pipeline connection section 1 of the one-piece flange-type valve and the left and right pipeline connection sections 3 and 6 to be structurally identical and interchangeable to simplify component fabrication, shorten the fabrication process, and lower production costs.

In summation of the foregoing section, since the main components of the invention herein are forged based on the blueprints of conventional cast one-piece and two-piece flange-type valves to facilitate the finishing process such that after assembly, a structurally unitary valve having forged qualities is produced, the invention herein provides an effective solution for the pitting and rough edge vestiges of cast metal components, raises production capacity and product quality, is easier to manage, reduces the defect rate, increases production volume, and lowers production costs to thereby strengthen market competitiveness,

What is claimed is:

1. A method of forming a multi-piece housing for a forged flange-type ball valve comprising the steps of:
    a) forging a ball valve housing with an outwardly extending first connection flange, a connection hole having a first diameter and a first passage communicating with the connection hole and having a second diameter greater than the first diameter, the first passage and connection hole passing completely though the ball valve housing;
    b) forging a pipeline connection section having an outwardly extending second connection flange on a first end portion, a second passage extending completely through the pipeline connection section, and a reduced diameter end portion on a second end portion opposite to the first end portion;
    c) forming external threads on the reduced diameter end portion of the pipeline connection section;
    d) forming internal threads on a portion of the ball valve housing bounding the connection hole;
    e) forming a ball valve seat in a portion of the ball valve housing bounding the first passage;
    f) forming a handle mounting hole in the ball valve housing in communication with the ball valve seat;
    g) forming a plurality of holes in at least the second connection flange;
    h) forming a gasket containment recess in an outer surface of the reduced diameter end portion of the pipeline connection section;
    i) inserting a water-tight gasket into the gasket containment recess; and,
    j) threading the external threads on the reduced diameter portion of the pipeline connection section into the internal threads of the ball valve housing to affix the ball valve housing and the pipeline connection section together such that the first passage, the connection hole and the second passage are aligned, to form the multi-piece, forged ball valve housing.

2. The method of claim 1 comprising the additional step of forming a plurality of holes in the first outwardly extending connection flange.

3. The method of claim 1 comprising the additional step of forming second internal threads in a portion of the ball valve housing bounding the first passage.

4. The method of claim 1 comprising the further steps of:
   a) forging a position limiter section having a second connection hole therethrough and a mating surface;
   b) forming second internal threads on a portion of the position limiter section bounding the second connection hole;
   c) forming a stepped position hole in the ball valve housing; and,
   d) attaching the position limiter section to the ball valve housing such that the mating surface contacts the ball valve housing and a portion of the position limiter section extends into the stepped position hole.

5. The method of claim 4 comprising the additional steps of:
   a) forging a second pipeline connection section having an outwardly extending third flange on a first end portion, and a third passage extending therethrough;
   b) forming second external threads on a second end portion of the second pipeline connection opposite to the first end portion; and,
   c) threading the second external threads of the second pipeline connection into the second internal threads of the position limiter portion to affix the second pipeline connection to the position limiter section.

* * * * *